No. 766,443. PATENTED AUG. 2, 1904.
C. HALLER.
HORSESHOE HOLDER.
APPLICATION FILED SEPT. 28, 1903.
NO MODEL.
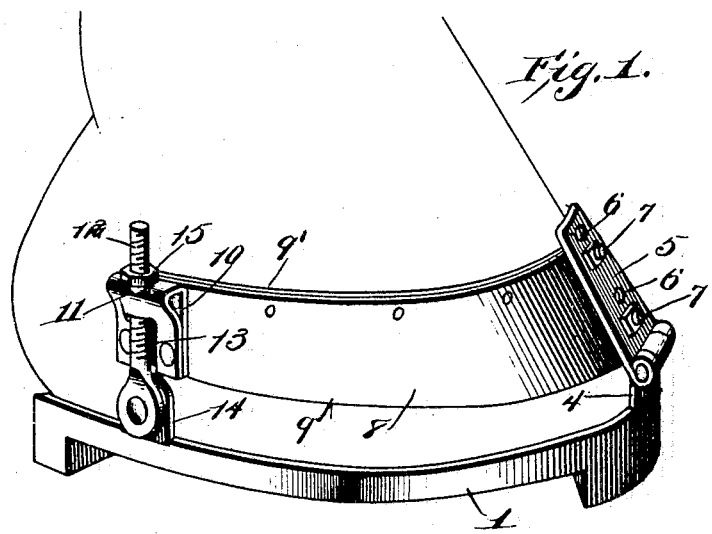
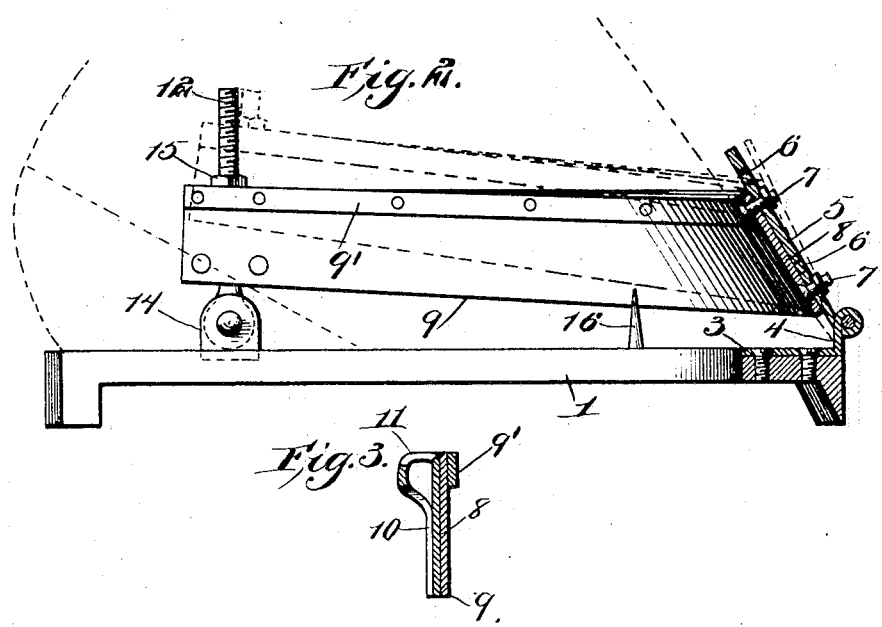
Witnesses  
Charles Haller, Inventor.

No. 766,443. Patented August 2, 1904.

UNITED STATES PATENT OFFICE.

CHARLES HALLER, OF HOOPER, COLORADO.

HORSESHOE-HOLDER.

SPECIFICATION forming part of Letters Patent No. 766,443, dated August 2, 1904.

Application filed September 28, 1903. Serial No. 174,961. (No model.)

*To all whom it may concern:*

Be it known that I, CHARLES HALLER, a citizen of the United States, residing at Hooper, in the county of Costilla and State of Colorado, have invented a new and useful Horseshoe-Holder, of which the following is a specification.

This invention relates to certain improvements in horseshoes, and more particularly to that class known as "nailless" shoes.

The object of the invention is to provide an inexpensive, durable, and efficient device of this character capable of being quickly attached to, or detached from, the animal's hoof and which may be worn without discomfort to the animal.

A further object of the invention is to provide a horseshoe adapted to be clamped in position by means of a securing-strap, said strap being adjustable to accommodate different shapes of hoofs and pivotally secured to the shoe in such a manner as to permit the same to be readily disengaged from the animal's hoof to facilitate the removal of the shoe.

A still further object is to provide the securing-strap with a cushion or guard to prevent the accumulation of dust and dirt between the securing-strap and the animal's hoof, thereby insuring proper contact of the strap with the hoof at all times.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the spirit or sacrificing any of the advantages of this invention.

In the accompanying drawings, Figure 1 is a perspective view of a horse's hoof having a shoe equipped with my improved holder secured thereto. Fig. 2 is a longitudinal sectional view showing in dotted lines the manner of adjusting the securing-strap, and Fig. 3 is a detail of the securing-strap and fastening-loop.

Similar numerals of reference indicate corresponding parts in all the figures of the drawings.

1 designates a horseshoe, of the usual form and construction, to the toe of which is secured in any suitable manner a plate 3, provided with an upwardly-extending lip 4. Pivotally secured to the lip 4 is a toe-strap 5, provided with one or more perforations or openings 6, and to which is adjustably secured in any suitable manner, as by pins or bolts 7, a securing band or strap 8, adapted to embrace the hoof of the animal and by means of which the shoe is securely clamped in position thereon. The securing band or strap 8 may be formed of any suitable material, being preferably formed of a strip of spring metal bent to conform to the shape of the animal's hoof, the disposition of the strap being such that the lower edge 9 thereof will bear against the hoof when clamped in position, while the upper edge will remain out of contact therewith, as clearly shown in Figs. 1 and 2 of the drawings.

A strip of leather, rubber, or other suitable material 9' is secured to the band 8, at the top thereof, which acts as a cushion and also as a guard to prevent the accumulation of dust and other foreign matter between the strap and the animal's hoof.

Secured to the opposite ends of the securing-strap are fastening members, preferably in the form of loops 10, provided with openings 11 for the reception of threaded pins or bolts 12, one end of each of said loops being bifurcated, as shown at 13, to facilitate the introduction of the bolts or pins in said openings. The bolts or pins are pivotally secured to brackets 14, fastened in any suitable manner to the shoe at points adjacent the heel thereof, nuts 15, engaging the threaded ends thereof, serving to clamp the securing-strap in contact with the animal's hoof, as shown. The shoe may be provided with one or more pins or spikes 16, adapted to engage suitable holes or openings drilled or otherwise previously formed in the hoof of the animal, so as to prevent accidental displacement of the shoe preparatory to fastening the securing-strap in position.

In use the securing strap or band is adjusted vertically on the toe-strap to accommodate the particular shape of hoof upon which the device is to be used and the strap or band held in position thereon by introducing the bolts or pins in the openings 11 of the fastening members, after which the nuts are tightened, forcing the lower edge of the strap in contact with the animal's hoof and effectually preventing accidental displacement of the shoe. A further adjustment of the strap or band may be had by tilting the same upwardly or downwardly in its pivotal connection, as shown in dotted line in Fig. 2, the pins or bolts being made sufficiently long to permit said adjustment. When it is desired to remove the shoe, the pins or bolts are loosened and the securing-band tilted rearwardly out of contact with the hoof, thereby permitting the shoe and holder to be easily detached.

The securing-band and fastening-loops may be formed integral by making the blank with a lateral extension and then bending the same downwardly on said strap, as will be readily understood, and instead of the pivotal connection between the strap and the shoe a spring-plate may be substituted, if desired.

From the foregoing description it will be seen I have provided a shoe and holder therefor capable of being readily adjusted to accommodate either a straight or flat hoof and which may be quickly secured in position without the use of nails or similar fastening devices.

By having the securing strap or band formed of spring metal the ends of said strap will have a tendency to expand and hold the same in engagement with the pivotal pins or bolts.

Having thus described the invention, what I claim, and desire to secure by Letters Patent, is—

1. A horseshoe-attaching device comprising, a securing-strap pivoted to the toe of the shoe, the lower edge of the strap being adapted to bear against the hoof of the animal and the upper edge thereof being disposed out of contact therewith, a flexible lining secured to the inner face of the strap at the top thereof, and clamping members pivoted to the heel of the shoe and adapted to engage the securing-strap.

2. A horseshoe-attaching device comprising, a securing-strap centrally pivoted to the toe of the shoe and having its opposite ends provided with perforated loops, threaded pins or bolts pivoted to the heel of the shoe and adapted to engage the openings in the loops and nuts engaging the threaded ends of the pins or bolts.

3. A horseshoe-attaching device comprising, a securing-strap centrally pivoted to the toe of the shoe, perforated loops provided with bifurcated side walls secured to the opposite ends of the strap, threaded pins or bolts pivoted to the heel of the shoe and having their free ends passing between the bifurcated portion of the loops and engaging the perforations formed therein and nuts engaging the threaded ends of the bolts.

In testimony that I claim the foregoing as my own I have hereto affixed my signature in the presence of two witnesses.

CHARLES HALLER.

Witnesses:
J. A. HEINZMAN,
L. B. WALLACE.